(No Model.)
O. JOHANSON.
DENTAL BROACH.
No. 498,554. Patented May 30, 1893.
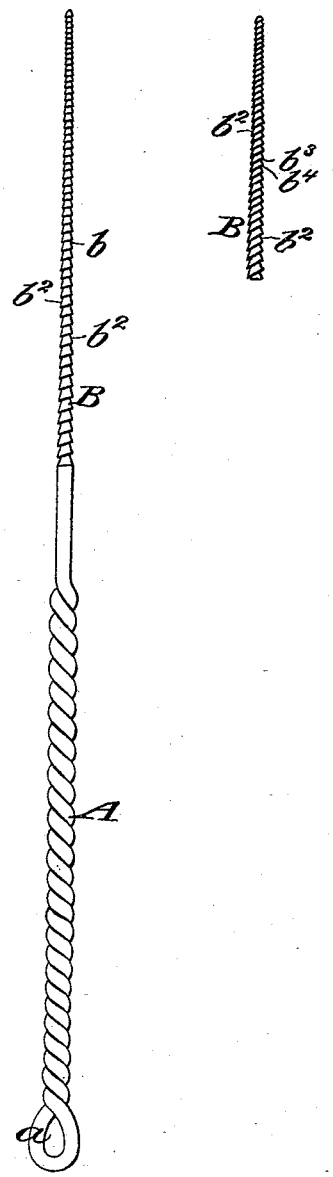
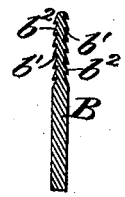
Witnesses:
C. Sundgren
George Barry.
Inventor:
Olof Johanson
by attorneys
Brown Ward
THE NORRIS PETERS CO., PHOTO-LITHO., WASHINGTON, D. C.

UNITED STATES PATENT OFFICE.

OLOF JOHANSON, OF NEW YORK, N. Y.

DENTAL BROACH.

SPECIFICATION forming part of Letters Patent No. 498,554, dated May 30, 1893.

Application filed January 21, 1893. Serial No. 459,038. (No model.)

*To all whom it may concern:*

Be it known that I, OLOF JOHANSON, of New York, in the county and State of New York, have invented a new and useful Improvement in Dental Broaches, of which the following is a specification.

My invention relates to an improvement in dental broaches in which a tapered prong for entering the nerve cavity is provided with a spur which winds in spiral form around the prong, after the manner of a screw thread, the spur having a tapered side toward the point and an abrupt side toward the shank of the prong.

A practical embodiment of my invention is represented in the accompanying drawings in which—

Figure 1 is a view of the broach in side elevation. Fig. 2 is a partial longitudinal section, and Fig. 3 represents a portion of a prong provided with two winding spurs as distinguished from a single winding spur, shown in Fig. 1.

The handle of the broach is represented by A. I prefer to form it by bending the shank over onto itself, making an eye $a$ and then twisting the two parts together. The material which I prefer to use is soft, tempered stub steel and is so tough that the broach may be tied in a knot without in any manner injuring it. The prong is denoted by B and is made round in cross section and tapered from the shank to the tip or point. A spur $b$ (Fig. 1) winds continuously around the tapered prong from its point back a distance of an inch more or less. The spur is made by cutting the round tapered prong with a sharp instrument, and the cut is preferably so made that the face $b'$ of the spur toward the shank is abrupt, while the opposite face $b^2$ slants away toward the inner edge of the face of the next succeeding turn of the winding spur.

In the form shown in Fig. 3, I have represented two winding spurs $b^3$ and $b^4$ instead of one. As compared with independent barbs arranged along one or more sides of a prong, as has heretofore been customary, the continuous spur or barb is much stronger and more durable, each part throughout its length serving to support the parts adjacent thereto and prevent the turning or rapid wearing away of the point of the barb, while the structure permits of screwing the prong gradually down into the cavity, if so desired.

The twisted handle is sufficiently flexible to adapt itself to the hand of the operator and afford a good, firm grasp.

What I claim is—

A dental broach having a round tapered prong provided with a winding barb or spur having its long tapered side toward the point and its abrupt side toward the shank, substantially as set forth.

OLOF JOHANSON.

Witnesses:
FREDK. HAYNES,
F. B. DECKER.